(12) United States Patent
Modén et al.

(10) Patent No.: US 7,937,165 B2
(45) Date of Patent: May 3, 2011

(54) METHOD AND DEVICE FOR TUNING AND CONTROL

(75) Inventors: Per-Erik Modén, Västerås (SE); Pontus Bergsten, Örebro (SE); Rickard Lindkvist, Västerås (SE)

(73) Assignee: ABB AB, Västerås (SE)

( * ) Notice: Subject to any disclaimer, the term of this patent is extended or adjusted under 35 U.S.C. 154(b) by 205 days.

(21) Appl. No.: 12/159,488

(22) PCT Filed: Dec. 18, 2006

(86) PCT No.: PCT/SE2006/050591
§ 371 (c)(1), (2), (4) Date: Jun. 27, 2008

(87) PCT Pub. No.: WO2007/078246
PCT Pub. Date: Jul. 12, 2007

(65) Prior Publication Data
US 2009/0138102 A1    May 28, 2009

(30) Foreign Application Priority Data

Dec. 30, 2005 (SE) .................................... 0502956
Feb. 7, 2006 (SE) .................................... 0600321

(51) Int. Cl.
G05B 13/02    (2006.01)
B23C 9/00    (2006.01)
B23C 3/00    (2006.01)
G05D 7/00    (2006.01)
G01V 3/00    (2006.01)
G04F 5/00    (2006.01)

(52) U.S. Cl. ......... 700/39; 700/282; 700/305; 324/307; 409/147; 409/152; 409/153; 409/159; 409/193

(58) Field of Classification Search .................... 700/39, 700/305, 30, 282; 324/307; 409/147, 152, 409/153, 159, 193
See application file for complete search history.

(56) References Cited

U.S. PATENT DOCUMENTS
3,852,578 A * 12/1974 Rice .............................. 700/30
(Continued)

FOREIGN PATENT DOCUMENTS
EP    1030231 A1    8/2000
(Continued)

OTHER PUBLICATIONS
Carlstedt et al., "Modern Approach to Flatness Measurement and Control in Cold Rolling", 1991, Iron-Steel-USA. p. 34-37.*
(Continued)

*Primary Examiner* — Albert Decady
*Assistant Examiner* — Thomas Stevens
(74) *Attorney, Agent, or Firm* — Venable LLP; Eric J. Franklin

(57) ABSTRACT

A method and a device for tuning and control of industrial processes having varying material flow rate. An adder is configured to add excitation signals to the controller output signal. A measurement system is configured to measure a property in response to the excitation signals. A model based tuning unit is adapted to estimate the value of at least one parameter with unknown value of a process model structure describing the effect of varying material flow rate, based on the measurements of the property and the output signal from the controller, and to calculate a model that describes the dynamics from controller output to controller input based on the estimated value of the parameter, and to perform model based tuning of the controller based on the model that describes the dynamics from controller output to controller input.

18 Claims, 6 Drawing Sheets

U.S. PATENT DOCUMENTS

| | | | |
|---|---|---|---|
| 4,006,346 A * | 2/1977 | Pemberton | 700/39 |
| 4,277,832 A * | 7/1981 | Wong | 700/282 |
| 4,814,968 A | 3/1989 | Fukumoto | |
| 4,882,784 A * | 11/1989 | Tump | 700/305 |
| 5,122,963 A * | 6/1992 | Chen | 700/129 |
| 5,260,865 A * | 11/1993 | Beauford et al. | 700/31 |
| 5,367,260 A * | 11/1994 | Dechene et al. | 324/307 |
| 5,539,634 A * | 7/1996 | He | 700/38 |
| 5,818,714 A * | 10/1998 | Zou et al. | 700/37 |
| 6,055,524 A * | 4/2000 | Cheng | 706/23 |
| 6,466,839 B1 * | 10/2002 | Heaven et al. | 700/128 |
| 6,539,267 B1 * | 3/2003 | Eryurek et al. | 700/51 |
| 7,062,403 B2 * | 6/2006 | Betz et al. | 702/145 |
| 7,243,052 B2 * | 7/2007 | Friman | 702/199 |
| 7,577,489 B2 * | 8/2009 | Fodor et al. | 700/154 |
| 7,748,247 B2 * | 7/2010 | Martin et al. | 72/11.7 |
| 7,840,287 B2 * | 11/2010 | Wojsznis et al. | 700/38 |
| 2003/0144746 A1 * | 7/2003 | Hsiung et al. | 700/28 |

FOREIGN PATENT DOCUMENTS

| | | |
|---|---|---|
| EP | 1498791 A1 | 1/2005 |
| WO | WO-97/07444 | 2/1997 |
| WO | WO-0018420 A2 | 4/2000 |

OTHER PUBLICATIONS

Wenbin et al., "The Optimal Flatness Control Method of One Kind Mill", 2001, South China Univ. Tech, China, p. 141-144.*

Kawarada et al., "On a Feed Rate Controller in Numerical Control of Machine Tools", 1972, Bulletin of Tokyo Institute of Technology, p. 29-34.*

Olsson et al., "Approaching the Absolute in the Flatness Control of Cold Rolled Strip", 1991, La Technique Moderne, p. 1-13.*

Åström, Karl J., et al., "A Survey of Adaptive Control Applications," *Proceedings of the 34th Conference on Decision & Control*, New Orleans, LA, pp. 649-654, Dec. 1995.

Extended European Search Report, dated Mar. 31, 2010, issued in connection with counterpart Application No. EP 06835945.4.

PCT/ISA/210—International Search Report—May 9, 2007.

* cited by examiner

METHOD AND DEVICE FOR TUNING AND CONTROL

CROSS-REFERENCE TO RELATED APPLICATIONS

This application claims priority to Swedish patent application 0502956-6 filed 30 Dec. 2005 and Swedish patent application 0600321-4 filed 7 Feb. 2006 is the national phase under 35 U.S.C. §371 of PCT/SE2006/050591 filed 18 Dec. 2006.

TECHNICAL FIELD

This invention relates to a method and a device for tuning and control of industrial processes having at least one actuator for affecting the quality of the produced products, and where the production speed or the material flow rate varies and thereby creates varying conditions for the control. The invention is preferably aimed for autotuning and adaptive control in rolling mill applications, e.g. for improving the flatness for rolled products using any number of mechanical or other actuators. The invention is also applicable to other processes where the varying material is, for example, a sheet, band, web, or a fluid.

BACKGROUND OF THE INVENTION

The flatness of a rolled product, e.g. a strip, is determined by the roll gap profile between the work rolls of a rolling mill and the thickness profile of the rolled strip. The strip flatness may then be influenced by manipulation of different control devices that affects the mill and its work roll gap profile. Such actuators may be mechanical devices such as work roll bending devices, intermediate roll bending devices, skewing or tilting devices, intermediate roll shifting devices, top crown actuators, or thermal devices such as work roll cooling/warming actuators etc.

In flatness control for cold rolling of metals, a number of actuators are used that influence the flatness profile. In the standard solution, the flatness deviations are mapped to the space of actuators with the help of a mill matrix, which describes the static flatness response from the respective actuators. This decomposition leaves a number of control loops, one for each actuator. These loops are equipped with PI controllers. Today, tuning of these controllers are based on off-line identification of models for each loop. In addition, known variations in the model, due to varying rolling speed for example, are taken into account in a parameter scheduling fashion. Two factors that make the process gain for each loop uncertain are its dependence on the rolled material, and possible discrepancy between the assumed mill matrix and the real behavior of the mill.

When rolling a strip, it is important to maintain the desired flatness profile at all times. Deviation from the desired flatness may result in costly strip breaks and scrap of produced coils. The task of the flatness control system is thus to drive the actual flatness profile as close as possible to the desired flatness profile, which put high requirements on the control system, in terms of calculation speed and accuracy.

Controllers for industrial processes need to be well tuned in order to reduce quality variations and keep the produced quality within specifications, in spite of varying conditions. In particular, a desire for a high production rate will often challenge the ability to control the process well enough to avoid both the production of off-spec material and interruptions in the production due to breakage. Sheet breakages in a paper machine or band rupture in a steel rolling mill are examples that may cause costly production losses.

The tuning of a controller is often based on a procedure to find a simple model from experiment data (from e.g. a step test) combined with a method to automatically find a good controller tuning, assuming this model to represent the behavior of the process well enough. For this procedure to be successful, it is essential that the model formulation is able to capture the actual behavior of the process during the experiment, and that the obtained model remains valid during the normal operation of the process with the varying conditions that may occur. The tuning method may allow some variation around the assumed nominal behavior, by putting a suitable degree of focus on robustness. If there are essential variations in process dynamics—for example with varying production speed—known such variations should be handled via parameter scheduling. If the variations occur during the tuning experiment, the model identification will be seriously disturbed if standard methods are applied.

A common approach is black-box identification that is to estimate the parameters in a discrete time formulation of the model, expressed for the same sampling period as used in the actual control. However, in the cases where some process dynamics vary with the production speed, the estimation will be disturbed by speed variations, since the true parameter values of the model will vary. This holds both if sampling is made per time unit, which is the most common case, since then the parts of the dynamics that do vary with speed will give varying discrete time model parameters, and if sampling is done per amount of material flow, which sometimes is done for practical reasons and also gives constant discrete time model parameter values for dynamics which have time characteristics proportional to the inverse of the speed, since then the parts of the dynamics that do not vary with production speed will give varying discrete time model parameters.

For the tuning of the PI control loops, in the standard solution for flatness control, varying rolling speed prevents use of black-box identification methods to determine a model. Sampling is performed per length unit. So the model of transport behavior would be invariant for sampled data, but the actuator dynamics does not get an invariant model for data sampled this way, and therefore the whole discrete time model will vary. In addition, the sampling period may vary due to a varying down-sampling multiple, and varying prefiltering in relation to this, as well.

To obtain accurate control, the controllers should be well tuned, based on how the process responds to changes of manipulated variables. The gain of the rolling process depends on a number of parameters that are not well known. For flatness control, the relevant gains are influenced by what material is being rolled, the actual agreement of the assumed mill matrix with reality, and other things.

After separation of the original control task, i.e. maintained flatness across the width of the produced material using several actuators, into several actuator-measurement loops, the current control strategy is based on standard control loop tuning during commissioning. Normally this is done as a single estimation of model parameters off-line for each loop and tuning for that model. To make this activity more efficient, the relevant model parameters should be estimated on-line and presented to the user in real time for decision when to end the activity. Further, the estimation should be performed in a way that is not disturbed by speed variations.

One problem is that if the process or the material changes, the control may become inaccurate, even if it has been accurate previously, which leads to poor product quality or to scrap. The change in material may, for example, cause changes in properties such as thickness, width, or hardness of the material. After a change of material, the control has to be adapted to the properties of the new material. The faster the control is adapted to the new properties, the faster the quality of the production is restored.

To avoid that problem adaptive control could be applied. Adaptive control usually applies black-box models. However, discrete time models with varying sampling period due to varying speed will have varying parameter values, due to the time invariant actuator associated dynamics. Thus adaptive control based on black-box identification of such models will be useless.

A problem in connection with tuning controllers for industrial processes with varying material flow rate, such as flatness measurement during rolling, is that the sampling rate of the measuring of the controlled property is dependent on the flow rate, such as the rolling speed, which leads to varying sampling intervals. It is easy and known to estimate a parameter for a time discrete model. However, it is not possible to use a time discrete model for tuning controllers for processes with varying material flow rate due to the variable sampling intervals.

SUMMARY OF THE INVENTION

The object of the present invention is to solve the problems related to tuning controllers for industrial processes with varying material flow rate that causes varying control conditions.

According to one aspect of the invention, this object is achieved by a method.
Such a method comprises:
  injecting excitation signals added to the controller output signal,
  receiving measurements of a property of the process in response to said excitation signals,
  choosing a process model structure comprising at least one parameter with unknown value, this model structure describing the effect of varying material flow rate,
  estimating the value of the parameter, based on the measurements of the property and an output signal from the controller,
  calculating a model that describes the dynamics from controller output to controller input based on the estimated value of the parameter, and on the basis thereof performing model based tuning of the controller.

The present invention makes use of prior knowledge and known data of the industrial process. According to the invention, a model structure describing the effect of the varying material flow rate is used. Some of the parameters of the model are already known. The remaining parameters, those that are unknown or are expected to vary, typically the process gain, are determined on-line by identification. This combined with a tuning rule, like a lambda-tuning rule, forms a tuning method. When applied to the control on-line, this forms adaptive control that takes care of process and material uncertainties and changes. When applied to autotuning, it gives a quick and reliable way to tune the controller. The present invention allows control of any type of actuator.

By using a continuous time model formulation and taking into account what is known about the process, the model structure is chosen to make the unknown parameters independent of the material flow rate, and of other varying parameters. By independent is meant that the true values remain reasonably constant in spite of varying material flow rate or varying other parameters. Thereby the number of parameters that need to be determined by estimation is minimized, and as a consequence the estimates become more reliable. A model based tuning method is then applied to the total model determined from estimated parameters, known parameters and relations and whatever signal processing actually applied.

The method of the invention creates an improved, stable and robust control system. The quality control problems, related to varying conditions due to varying material flow rate with present solutions, especially in combination with varying material parameters and slowly changing process parameters, are heavily reduced with the proposed invention.

The method achieves the advantage over an adaptive controller based on discrete time black box model identification that the parameters it has to find by estimation remain constant over longer periods, for example independent of production speed, which makes the mere application of adaptation much more feasible. This in turn provides the basis for actually being able to increase the control performance compared with non-adaptive control. The profit of the increased performance is typically found in higher production speed at the same quality level, and/or higher produced quality at the same production speed, meaning less scrap or better price or both, and/or fewer production stops. Used as support for initial tuning, the method can also shorten commissioning times.

An example where the invention is applicable is flatness control in cold rolling of metals. The tension profile is there measured with a measurement roll that has sensors in four arrays. The measurement system takes a complete tension profile sample four times per revolution and converts it to a flatness profile. We thus have a case of sampling per amount of material flow, or more precisely per length of rolled material. The measurement can be mapped to a number of control loops using the assumed static response from the actuators. The actual dynamic response in the different control loops consists mainly of responses of the actuator servos or the heating or cooling responses in case of thermal device actuators and of response associated with the transport of the band. The part related to the actuator is considered time invariant, and the time characteristics (dead-time, time constant) related to the transport are inversely proportional to the rolling speed. Black box identification of discrete time models for this type of processes is useless, since the result would be valid only for that operating point. The method of the invention, on the other hand, provides estimates that are both valid over the whole operating range and easy to interpret by the user.

Furthermore the invention will enable the operators to fully use automatic mode, which may enhance the output of the mill in terms of less scrap produced and/or higher rolling speed keeping the same quality.

According to an embodiment of the invention, the method comprises choosing a process model structure, which is time continuous and comprises parameters being independent of varying material flow rate. This embodiment makes it possible to estimate parameters for the model despite the variable sampling intervals.

According to a further aspect of the invention, the object is achieved by a computer program product directly loadable into the internal memory of a computer or a processor, comprising software code portions for performing the steps of the method, when the program is run on a computer. The computer program is provided either on a computer-readable medium or through a network, such as the Internet.

According to another aspect of the invention, the object is achieved by a computer readable medium having a program recorded thereon, when the program is to make a computer perform the steps of the method, and the program is run on the computer. According to another aspect of the invention, this object is achieved by a device.

Such a device comprises an adder for adding excitation signals to the controller output signal, a measurement system for measuring said property in response to said excitation signals, and a model based tuning unit adapted to estimate the value of at least one parameter with unknown value of a process model structure describing the effect of varying material flow rate, based on said measurements of said property and the output signal from the controller, and to calculate a model that describes the dynamics from controller output to controller input based on the estimated value of said parameter, and to perform model based tuning of the controller based on said model that describes the dynamics from controller output to controller input.

BRIEF DESCRIPTION OF THE DRAWINGS

For a better understanding of the present invention, reference will be made to the below drawings/figures.

DETAILED DESCRIPTION OF PREFERRED EMBODIMENT

Figure 1:
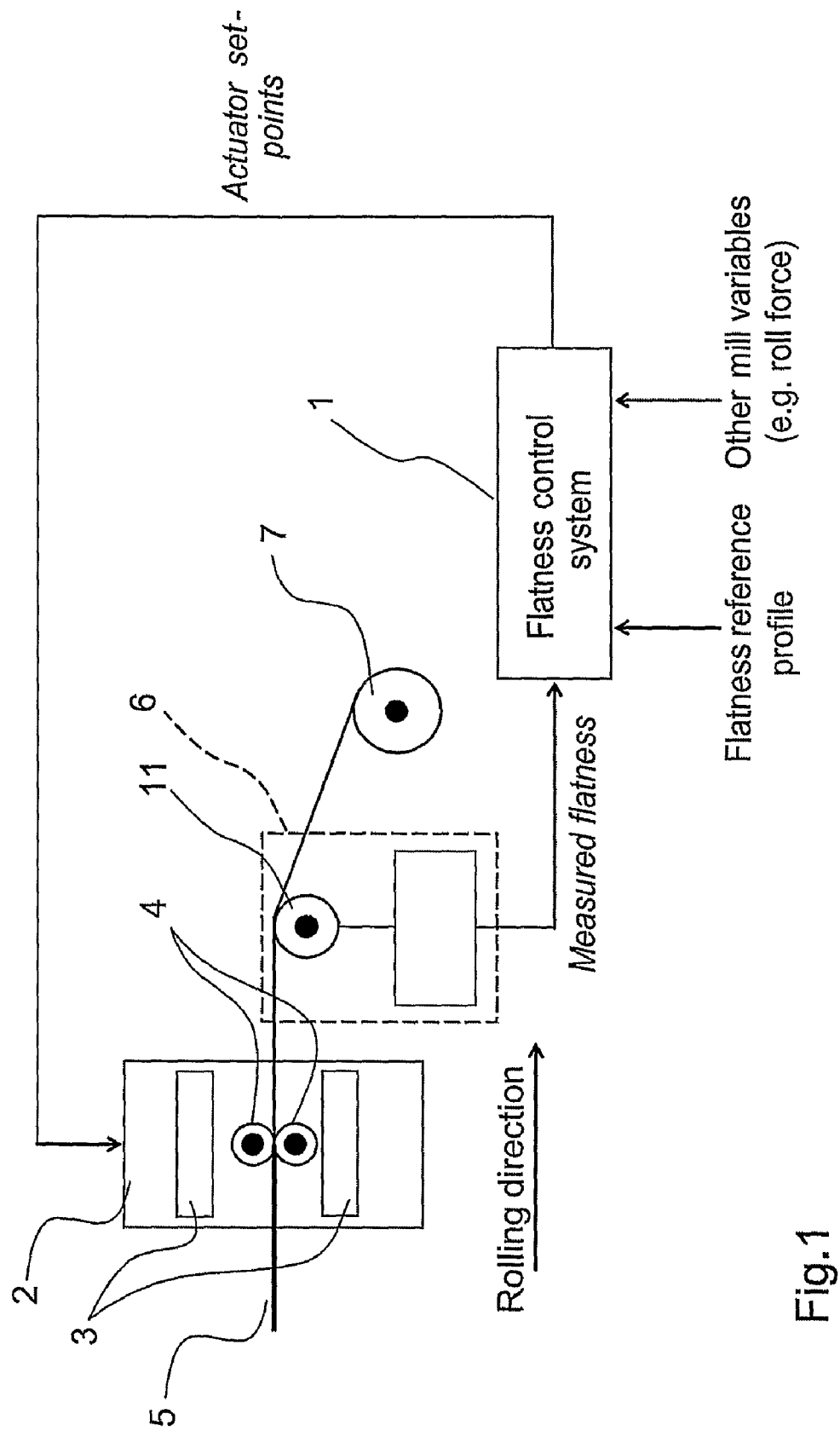
FIG. 1 illustrates an outline of a rolling mill with one mill stand and control devices, actuators, a flatness measurement device and the flatness control system.

The invention concerns a method for automatic controller tuning that can be used for one-shot tuning and equally well for adaptive control. In a typical application of the invention, an industrial process has to some extent time-invariant dynamics, and to some extent time characteristics—such as dead-time and time constants—inversely proportional to the production speed or material flow rate. The parameterization may be chosen according to actual knowledge about the behavior of the process and the influence of the production speed, so that the true but unknown values of the estimated parameters will be constant, independent of the speed and other varying parameters. Thereby, the estimation will not be disturbed by speed variations, and there will be few parameters to estimate. As a consequence, more accurate estimates are obtained in a shorter time, and they are not disturbed by running the process with normal production according to planned schedules during an auto-tuning session or any duration of adaptive control. The actual controller tuning uses a model that combines the previous knowledge of the process behavior, including the influence of the process speed, and the knowledge obtained through the estimated parameters.

The effect of whatever signal processing/transformation/mapping is performed in the control system is also incorporated in the model used for the tuning. Thus, the invention provides adaptation for unknown variations that have to be caught by estimation, in addition to parameter scheduling for known variations. The result is better control, and it is obtained faster and with better accuracy compared with previously known methods. This leads to less off-spec production and allows higher production speed with preserved quality.

In the example of flatness control in cold rolling of metals, it is known that the actuator dynamics as well as any delays due to communication and processing are independent of the rolling speed. The speed may vary, and it will then influence the dead-time and/or time constant required describing the transport behavior. Furthermore, the measurement system may apply a filter to the basic measurement and it may down-sample the measurements so the actual sampling period becomes an integer multiple of the basic one. Both the filter transfer function and the down-sampling multiple can be varied intentionally in relation to the rolling speed. These variations in speed, filter and sampling multiple are known.

The parameters to estimate for each control loop may be chosen to be:
a time constant $\tau_a$ describing the actuator response,
a dead-time $D_0$ (the part of the total dead-time that is independent of rolling speed),
a gain K, and
a factor $\xi$ describing to which degree the transport behavior is a pure dead-time or a time constant.

The true values of these parameters are independent of the speed and the varying signal processing, as required. Expressed as lengths, the pure transport dead-time is the distance $L_d$ from roll gap to measurement roll, and the pure time constant, for transport response, is the length $L_m$ from roll gap to coiler. These distances could, in order to express them in time, simply be divided by the speed. The distances are constant and known.

Since the transport response for different actuators differs and is not known in advance, it is assumed for each individual actuator to be a pure dead-time to degree $\xi$, and a pure time constant to degree $(1-\xi)$. This defines the transport behavior parameter $\xi$. The speed independent dead-time, $D_0$, represents the total pure delay from measurement to actual start of change at the roll gap due to actuator movement, i.e. the average sum of processing time, communication and processing delay and any pure delays in the actuator system.

Once these parameters $(K, \tau_a, D_0, \xi)$ have been determined, according to the invention, by estimation in an autotuning session during commissioning or re-tuning, they are all expected to remain constant, with the exception of the gain, K. Since the gain will vary with varying material, and also with possible deviation of the assumed mill matrix from the true one, adaptive control is applied, where the gain is the only parameter to estimate, while at the same time known parameter variations are taken care of in a parameter scheduling fashion.

As mentioned above, adaptive flatness control according to the invention makes use of prior knowledge of the models, per loop, and determines their gains on-line by recursive identification. This combined with a lambda-tuning rule (or some other tuning rule) forms adaptive control for each loop, applied during the initial rolling of each new coil. The model structure, the actuator dynamics, the speed dependent transport behavior, and the speed independent dead-time are used as prior knowledge for the adaptive control.

The parameters included there $(\tau_a, D_0, \xi)$ are preferably determined in a recursive identification experiment, performed once for all for each loop, with excitation signals supplied to the actuators in open loop or added to the controller outputs in closed loop. Known factors involved in the transport behavior are the rolling speed and the physical distances in the mill. Other factors taken into account, as prior knowledge in the tuning, are the sampling rates and the filtering applied. These may vary also during the rolling of a single coil. The sampling period is a multiple of the one used in the basic measurement sampling. This multiple may vary, and the basic sampling period is inversely proportional to the rolling speed. A moving average filter is applied, the length of which may vary. It is applied at the basic sampling rate.

The recursive identification for initial determination of parameter values, and the one used during adaptive control are quite similar, apart from the number of parameters they handle as free to estimate. They do use the knowledge of the model structure and the varying sampling and filtering, and estimate the parameters in a continuous time formulation of the model. Thereby, the estimated parameters are independent of the actually used speed, sampling and filtering. For certain situations, the recursive identification is also supplied with several robustifying enhancements—compared with the standard textbook methods—such as outlier protection, adaptation dead zones, and constraints for estimated parameter values.

Figure 2:
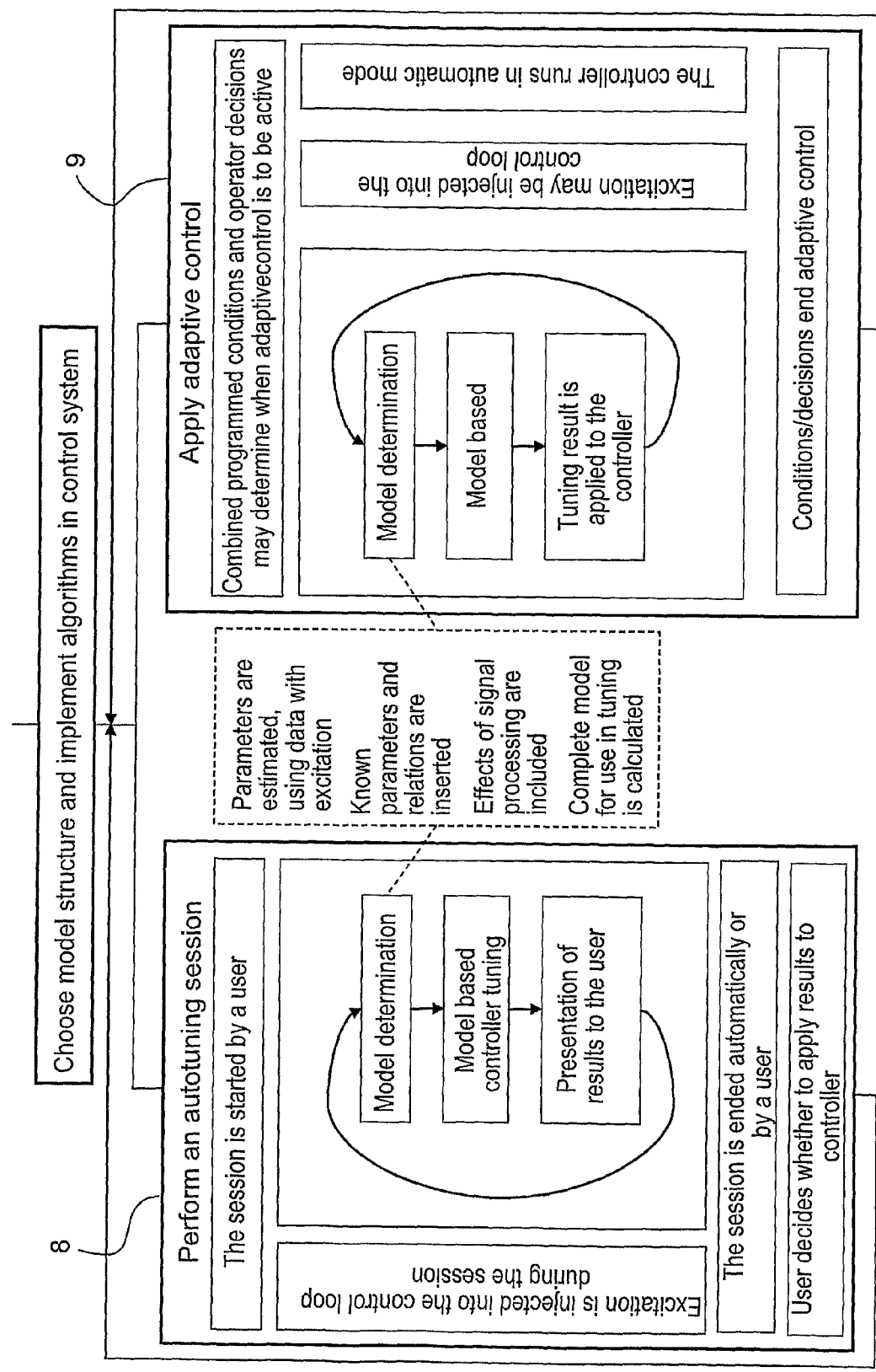
FIG. 2 illustrates the invention schematically.

FIGS. 1-4 illustrate the invention by showing how it can be applied for flatness control. What is shown in FIG. 2 is generic.

As disclosed in FIG. 1, a flatness control system 1 is integrated in a system comprising a mill stand 2 having several actuators 3 and rolls 4. An uncoiler, not shown, feeds a strip 5 to and through the mill stand 2, whereby the strip 5 passes a flatness measurement system 6 for example a "Stressometer" system, and is rolled up on a coiler 7. The mill stand 2 may control skewing, bending and/or shifting of the rolls 4. Thereby, they change the shape of the roll gap, which is where the strip 5 is affected as it passes between the rolls 4. There may also be heating or cooling actuators or any other type of actuators that influence the roll gap. The resulting product of the rolling process is a rolled strip 5 with desired flatness. In a tandem mill, not shown, the incoming strip would come from a preceding mill stand, instead of an uncoiler. Such variations between mills are unimportant from the flatness control point of view, and the flatness control system would be identical. The flatness control system 1 is designed comprising a number of advanced building blocks, as can be seen in FIG. 3, having all required functionalities.

As disclosed in FIG. 2, illustrating principally a flow chart of the invention, the method according to the invention involves selection of a model structure. The further steps of the invention are performed in either of two modes, tuning session 8 or adaptive control 9. In both cases, excitation can be applied to the process and parameter estimation provides values for the otherwise unknown parameters, based on data from operation of the process. With the model structure given, previously unknown parameters determined by estimation and known parameters and relations inserted, the process model is designed. Then, if there is any signal processing performed, the effect of it is also added to form a complete model. This complete model is used for the controller tuning, where any adequate model based method can be applied. The model determination and the model based tuning are repeated as new data becomes available with new sampling instants.

During a tuning session, the results of parameter estimation and tuning are presented to the user, thereby allowing judgment and decision when to end the session. The final result of the tuning session will be applied to the controller if the user decides so. A tuning session can be performed either in open loop, or with the controller in closed loop operation. During adaptive control, the controller operates in closed loop, and tuning results are applied to the controller as they occur. Whether the control shall be active or not, and whether it shall be adaptive, is determined by programmed conditions and/or operator decisions.

Figure 3:
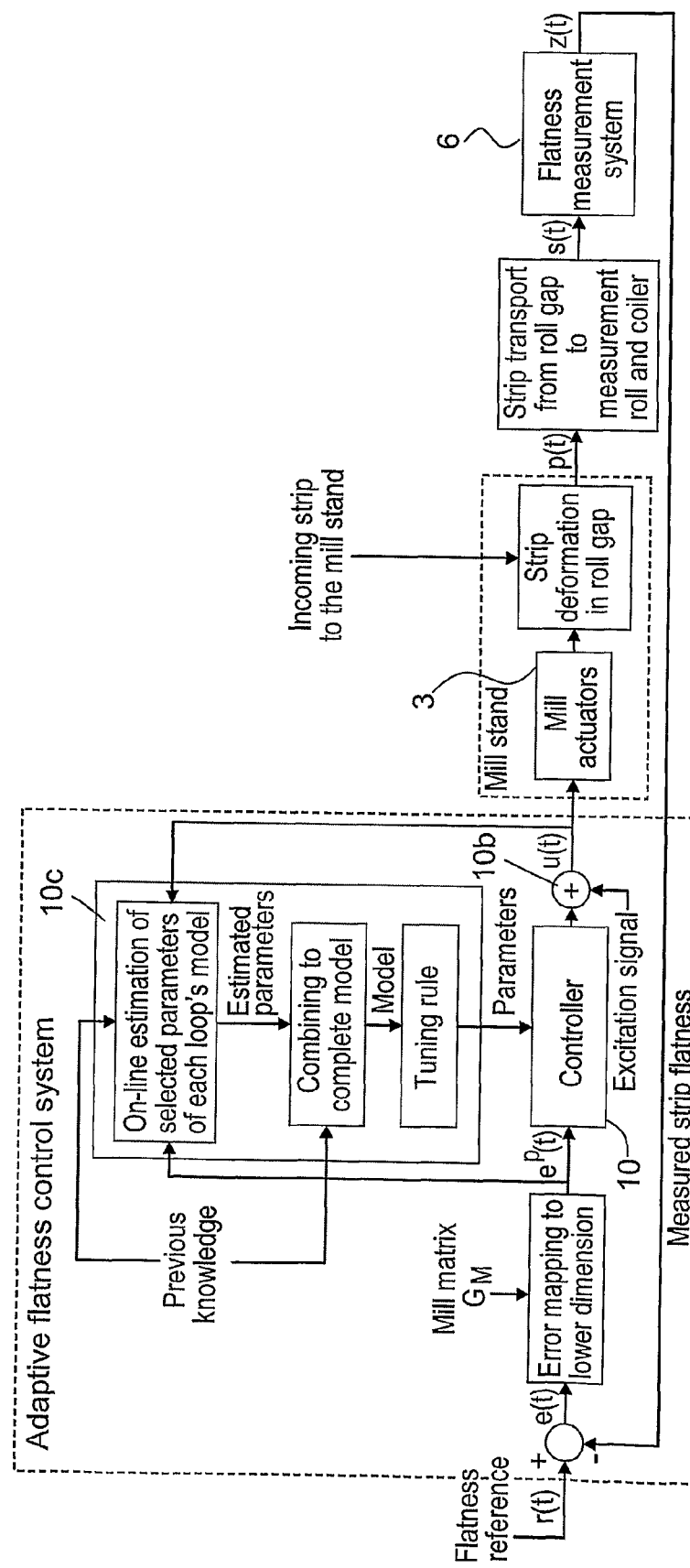
FIG. 3 illustrates principally a block diagram of adaptive flatness control.

In FIG. 3, an adaptive flatness control system, based on the invented tuning method, is disclosed. The block Controller 10 can be interpreted as either a multivariable controller or a number of single loop controllers. The latter case is described here, assuming the control task to be divided into a number of control loops equal to the number of mill actuators, each control loop with its own single-input-single-output controller.

The controller outputs u(t) are fed to the actuators 3 or the actuator servos, not shown. The actuator movements affect the roll gap in the mill stand 2 and thereby the local properties p(t) of the strip just passing the roll gap. The measurement system 6 senses the tension distribution s(t) across the strip 5 via the measurement roll 11 at a position between the roll gap and the coiler 7. With a Stressometer system, s(t) is sampled four times per revolution of the measurement roll. The flatness measurement system 6 translates the raw measurement into a flatness profile z(t). This may involve filtering and re-sampling. The vector z(t) typically has a dimension between 16 and 64. The vector z(t) is compared with the flatness reference r(t) in order to produce a difference value, the flatness error e(t). This flatness error e(t) is mapped to the space of actuators to produce the so called parameterized error $e^p(t)$. The dimension of u(t) and $e^p(t)$ is less or equal to the number of mill actuators 3.

The tuning involves injection of excitation signals added to the controller outputs and the use of gathered values of u(t) and $e^p(t)$ to estimate parameters of a model of the process for each control loop. In doing this, what is previously known about the process is used, so that only the unknown parameters need to be estimated. The estimated values of the unknown parameters are then used together with what was known before to form a complete model that describes the whole dynamics from controller output to controller input, so that it can be used to tune the controller with a model based tuning rule. The excitation signal is generated until the estimation of the parameters is sufficiently accurate. This tuning gives as a result the controller parameters to be used. The parameter estimation, the forming of a complete model and the tuning are performed for each control loop. The parameter estimation and tuning is performed on-line and the tuning result is also applied on-line to provide adaptive control. It is an advantage to have few parameters to estimate in adaptive control. It can be as few as one parameter per control loop, the process gain. Its true value may differ from coil to coil, but will be the same throughout the same coil. Therefore, adaptive control should be applied during the initial rolling of a coil, until the gain value has been found. After that, the excitation signal is cut off (set to zero), and no further estimation will be performed for that control loop, but the tuning rule will still be used to provide parameter scheduling, as the model will be updated with updated previous knowledge, such as rolling speed, filter transfer function and sampling period.

The same block scheme applies to an auto-tuning session during commissioning or re-tuning, except that the controller parameters fed to the controller will then not be continuously updated for new estimated parameter values. Instead, the progression of the estimates will be presented to the user to allow judgment, when to consider the results satisfactory and end the session and quit applying excitation signals. It is also possible, in an auto-tuning session, to have the controller in manual mode with only the excitation signal being fed to the involved mill actuator.

Figure 4:
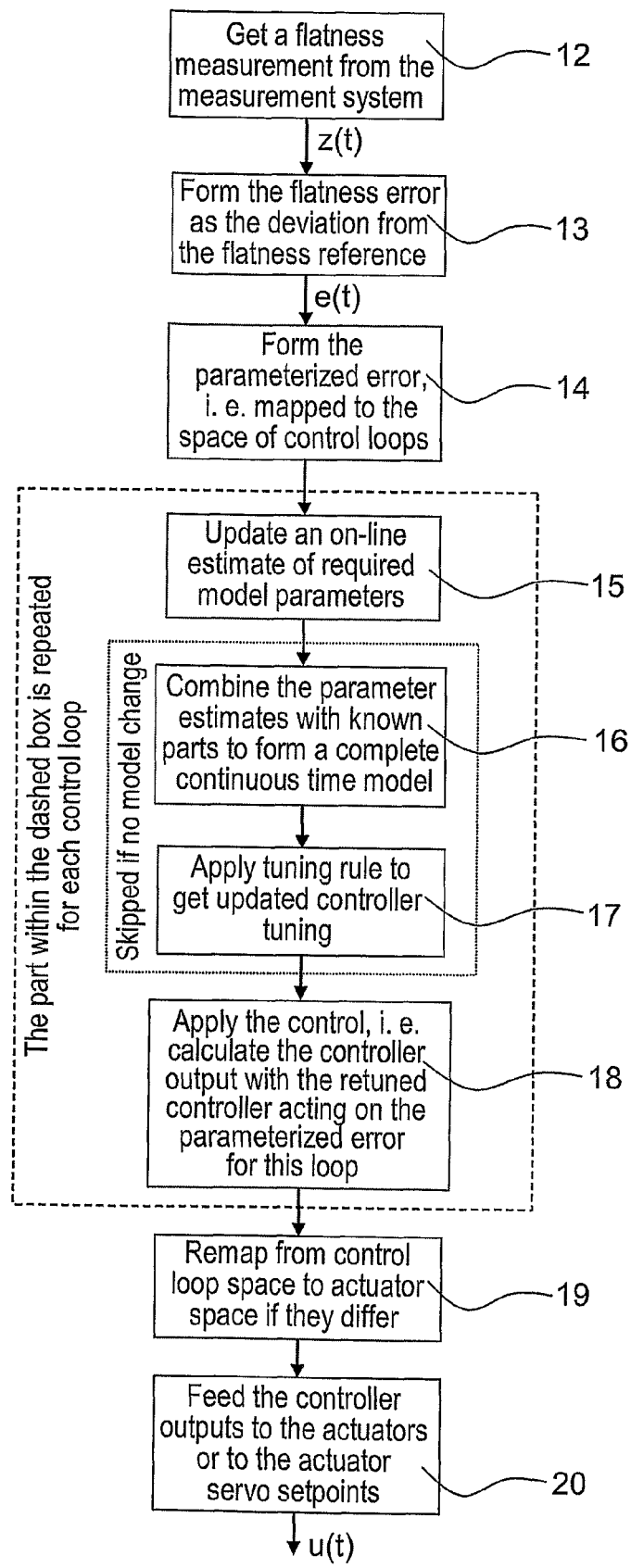
FIG. 4 illustrates a flow chart of the different method steps in an adaptive flatness control system.

The flowchart of FIG. 4 discloses the sequence of steps that are executed repeatedly, for the example of a flatness control system based on the invention. The first action, described in block 12, is to get a flatness measurement from the measurement system 6. The measurement roll 11 gives in this case four measurements per revolution, and the measurement system 6 delivers a new, possibly filtered, measurement at either this rate or the rate down-sampled by an integer factor.

The following action 13 is to form or determine the flatness error as the deviation from the flatness reference. The measurement is a vector, and it is subtracted from a corresponding reference vector to form the flatness error.

The third step 14 is to form or determine the parameterized error, i.e. mapped to the space of control loops. The number of control loops is less than the dimension of the measurement vector, so the error is projected to the smaller dimension corresponding to the number of control loops, using the mill matrix, which models the strip deformation per controller output.

A fourth step 15 is to update an on-line estimate of required model parameters. Using a continuous time model, some parts of the model and its structure can be treated as known, while a smaller number of parameters are estimated on-line as depicted in a separate figure.

A further step 16 is to combine the parameter estimates with known parts to form a complete model. When forming this final model, all is taken into account, i.e. estimated parameters, constant parameters treated as known, and also parameters that may vary in a known manner, such as production speed, sampling period, and measurement filtering (as parameter scheduling).

Another step 17 is to apply a tuning rule to get updated controller tuning. Any appropriate model based tuning method can be applied. For PI controllers, lambda tuning combined with model reduction to its required model form, first order plus deadtime, can be used. Inputs to the tuning are the final model and an adjustable parameter specifying the required tradeoff between performance and robustness.

The seventh step 18 is to apply the control, i.e. calculate the controller output with the retuned controller acting on the parameterized error for this loop. The controller (e.g. a PI controller) keeps operating as any normal controller. It just gets its tuning parameters updated on the fly (gain and reset time in the case of a PI controller).

The method steps 15 to 18 are repeated for each control loop and the method steps 16 and 17 can be skipped if there is no change in either of estimated parameters for the loop or parameters used for scheduling (speed, sampling period, measurement filter).

The next step 19 is to remap from control loop space to actuator space if they differ. If the actuators are mapped to a lower number of control loops, the controller outputs are also remapped to the actual number of actuators.

The next step 20 is to feed the controller outputs to the actuators or to the actuator servo setpoints. There are normally servos for each actuator, and in those cases the controller outputs are fed to these servos rather than directly to the actuators.

Figure 5:
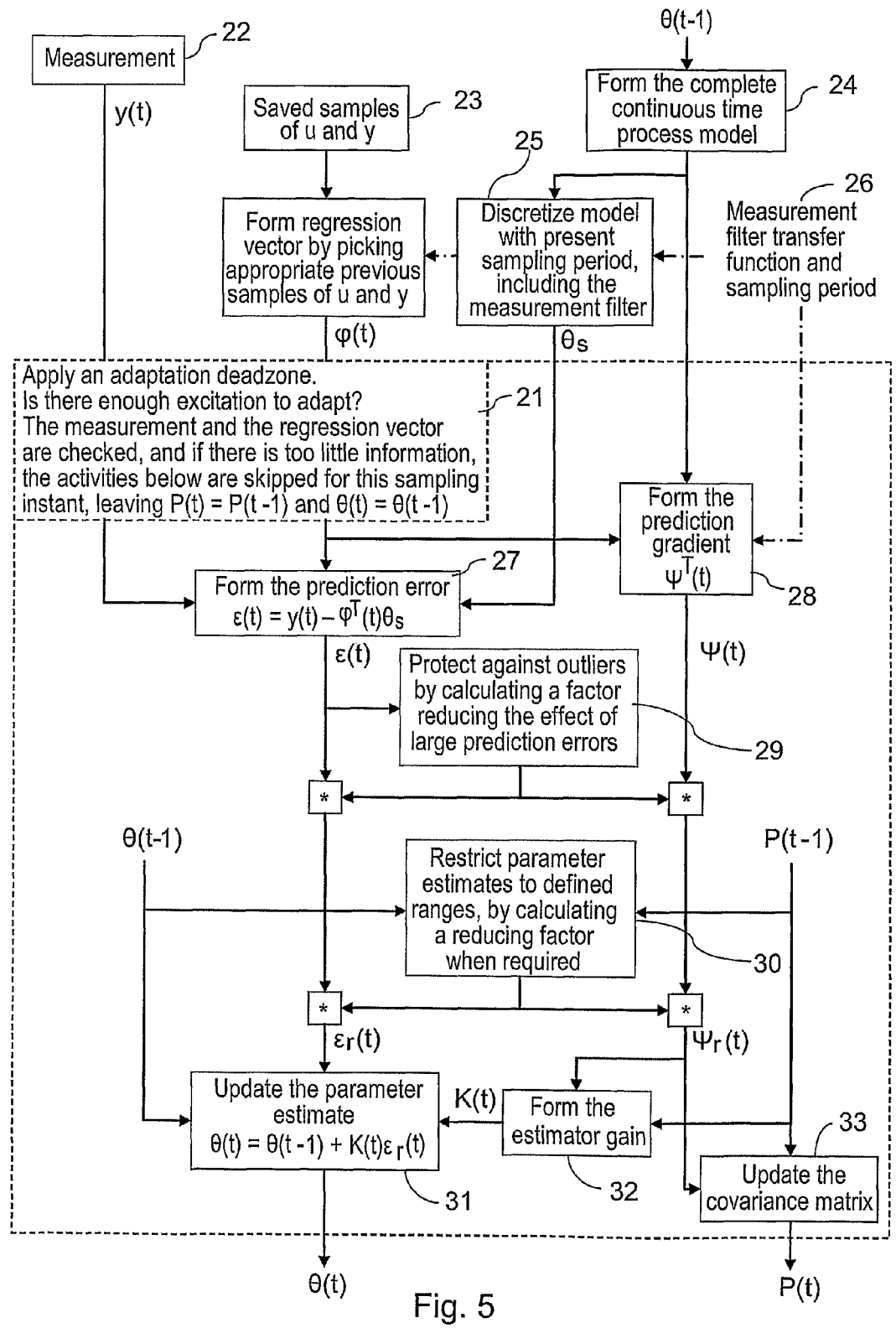
FIG. 5 illustrates in more detail the function of the method step "Update an on-line estimate of required model parameters" of FIG. 4.

The block scheme of FIG. 5 illustrates the essential actions or steps of an example of implementation for recursive estimation of physical parameters in a continuous time dynamic model according to the invention. The process modeled has inputs that influence it and are available for control of it, and it has outputs. It can be part of a larger process, where this part has been selected to form a control loop together with the controller assigned to it, one loop of possibly many.

The block scheme of FIG. 5 shows activities performed when a new measurement becomes available. They need not necessarily be executed every sample, but can possibly be performed more seldom according to some criterion. One such criterion is indicated within the scheme, an adaptation deadzone 21, meaning that when there is too little information in the data, no parameter update will be performed.

Measurements 22 are obtained at sampling instants, which may occur at any sampling rate, and the changes of the process input u are associated with these sampling instants. Thus pairs of y and u are known in 23 for a number of instants back in time. Some of these samples of y and u are gathered in a regression vector $\phi(t)$ to be used in a discrete time model to predict the present measurement y(t). The current model is formulated in continuous time, and some of its parameters may be treated as known, while others are to be estimated. At time t, the previous estimate of these parameters is the vector $\theta(t-1)$. The complete continuous time process model is formed in a step 24 assuming that these estimates are the true values, and this model is converted to the required discrete time prediction model in a step 25, using the appropriate sampling period. In doing this, the effect of any measurement filter 26 is also taken into account.

The prediction error $\epsilon(t)$ is formed as the difference between the actual measurement and the prediction in a step 27. For the update of the estimate, the gradient $\psi^T(t)$ of the prediction with respect to the estimated parameters is also needed. It can be derived analytically, or it can be obtained by numeric differentiation in a step 28. The latter approach means that predictions are calculated for a set of models where the estimated parameters are perturbed a little. The difference in the prediction divided by the perturbation in the parameter is an approximation of the required partial derivative with respect to that parameter.

Now, with the prediction error $\epsilon(t)$ and the transposed prediction gradient $\psi(t)$ derived, the rest of the parameter update could be a matter of standard recursive identification. However, two important practical extensions are indicated in the block scheme, outlier protection 29 and restriction of parameter estimates 30.

Figure 6:
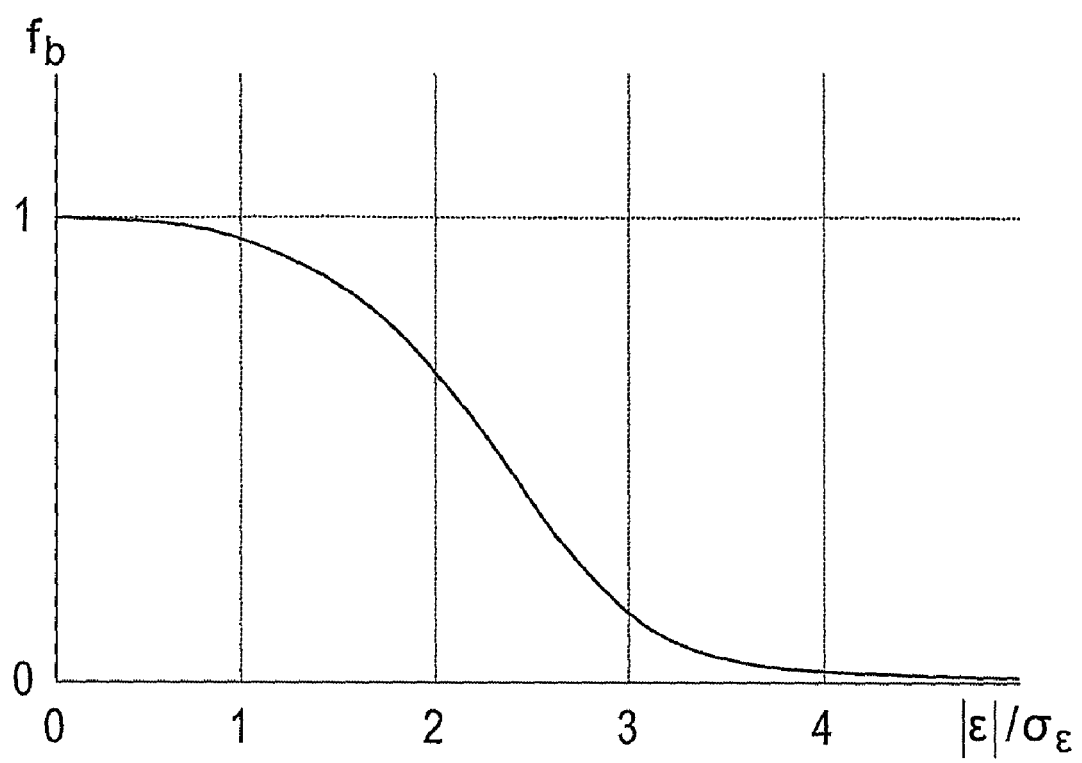
FIG. 6 illustrates in a diagram the belief factor as function of the ratio between prediction error and estimated standard deviation of prediction errors.

The outlier protection compares the size of the present prediction error with what it has been statistically and calculates a factor that reduces the effect of large errors substantially as in 29. See FIG. 6, which presents an example of this belief factor, $f_b$. The function involves on-line estimation of the variance of the prediction errors, to compare the present size with. In a simple case, this variance estimation is performed just by low pass filtering the squared prediction errors.

When the intended parameter update reaches outside the allowed range for any parameter, some counteraction is required to make the estimate stay inside. This can be achieved in a number of different ways. The one indicated here assumes that the true parameter value lies inside the specified limits. An update pointing outside is treated, by analogy with outliers, by scaling down the prediction error and the prediction gradient with a common factor as in step 30. The value of the factor can be chosen to place the updated estimate exactly on the border of the allowed area, or at some fraction or distance inside. An alternative approach that does not require the true value of a parameter to be inside the allowed range, is to set the offending parameter estimate to the limit and re-estimate the remaining parameters. This is efficiently done as a Markov estimate of the remaining parameters, treating the original estimate as a measurement that was disturbed by a white noise with covariance equal to the covariance matrix P associated with the recursive estimation.

The prediction gradient $\psi_r(t)^T$ and the prediction error $\epsilon_r(t)$, after possible reduction due to outlier detection or estimates tending outside the allowed area, are used to determine the direction and size of the parameter estimate update action 31. The estimator gain K(t) multiplies the prediction error $\epsilon_r(t)$, and this gain is determined in step 32 by the prediction gradient and the covariance matrix P at the previous instant. In case a forgetting factor $\lambda$ is used, it is calculated as $$K(t)=P(t-1)\psi_r(t)[\lambda+\psi_r(t)^T P(t-1)\psi_r(t)]^{-1}.$$

In the update action 33 of the covariance matrix P, there are several practical aspects to consider. The one of forgetting is widely known. Whether it is implemented as uniform forgetting or directional forgetting or relies on a Kalman filter approach or addresses a target on the trace of P, can be a matter of taste. Related to the forgetting is also the risk of covariance wind-up. It can be counteracted by refraining from updating at all, when there is too little information, as will be the case when applying an appropriate adaptation deadzone. The covariance matrix is normally updated in factorized form, for example by writing it as $P=LDL^T$, and updating L (lower triangular matrix with unit diagonal) and D (diagonal matrix) rather than P itself.

The basic algorithm for recursive identification based on prediction errors is presented below, cf. Chapter 9.5 of Söderström and Stoica, "System Identification" (Prentice Hall, 1989).

$$\epsilon(t)=y(t)-\hat{y}(t|t-1;\hat{\theta}(t-1))$$

$$\hat{\theta}(t)=\hat{\theta}(t-1)+K(t)\epsilon(t)$$

$$K(t)=P(t)\psi(t)=P(t-1)\psi(t)[1+\psi^T(t)P(t-1)\psi(t)]^{-1}$$

$$P(t)=P(t-1)-K(t)\psi^T(t)P(t-1) \quad (1)$$

The expressions for the prediction $\hat{y}(t|t-1;\hat{\theta}(t-1))$ and its gradient $\psi^T(t)$ with respect to the parameter vector will depend on the model formulation and on assumptions regarding the character of the disturbances. For the case of identification of a continuous time model where the present prediction and response involve equidistantly sampled data, the following approach is possible. A vector $\theta_s(\hat{\theta}(t-1))$ holding the corresponding discrete time prediction model parameters is calculated from the model obtained with the estimate $\hat{\theta}(t-1)$ using the actual sampling period, and the involved values of measurement samples and manipulated variables (those required for the prediction) are gathered in a vector $\phi(t-1)$. Then the prediction is formed as $$\hat{y}(t|t-1;\hat{\theta}(t-1))=\phi^T(t-1)\theta_s(\hat{\theta}(t-1)) \quad (2)$$

There is, here, an underlying assumption that the disturbances can be modeled according to what is known as an 'arx' structure for the discrete time model. (arx=Auto–Regressive with control.) An 'arx' model is often written (with e(t) denoting white noise):

$$y(t)+a_1 y(t-1)+\ldots+a_{n_a}y(t-n_a)=b_1 u(t-k)+\ldots+b_{n_b}u(t-k-n_b+1)+e(t) \quad (3)$$

The optimal one-step-ahead predictor for this model is of the type shown above, in (2), with $$\phi^T(t-1)=[-y(t-1)\ldots-y(t-n_a)u(t-k)\ldots u(t-k-n_b+1)]$$
$$\theta_s^T=[a_1\ldots a_{n_a}b_1\ldots b_{n_b}] \quad (4)$$

With this approach, the steps to take in order to form the required discrete time parameter vector involve forming the continuous time model—based on the estimated parameters and what else is known—and then translating it to discrete time, in a well-known manner, and expressing the resulting model in transfer function form so that the parameters $a_1 \ldots a_{n_a} b_1 \ldots b_{n_b}$ and k are obtained. This is illustrated by the following example, a first order process with a deadtime that partly depends on the transport flow rate, v. The continuous time model is in this example $$\frac{K}{1+\tau s}e^{-D_0 s}e^{-L/v^s} \quad (5)$$

In a real case L would probably be considered as a known parameter as well as the flow rate or speed, v. The remaining parameters—the gain K, the time constant $\tau$, and the speed independent part $D_0$ of the deadtime—are either considered known, or constitute part of the estimated parameter vector $\theta$, which means they are the ones that get their values by recursive estimation. Anyhow, the model (5) is formed. The corresponding discrete time model for the sampling period h is $$K\frac{1-\beta+(\beta-\alpha)q^{-1}}{1-\alpha q^{-1}}q^{-k} \quad (6)$$

where $\alpha=e^{-h/\tau}$, $\beta=e^{-(kh-D)/\tau}$, $D=D_0+L/v$, and k is D/h rounded to the nearest higher integer. Thus, the corresponding arx model is of the form (3), with k as given above and $$a_1=-\alpha b_1=K(1-\beta)b_2=K(\beta-\alpha)n_a=1 n_b=2 \quad (7)$$

In a general case, the continuous time model would most conveniently be formulated as a state space model, which is converted first to a discrete time state space model, and then to transfer function form—still in accordance with the illustrating example above. The approach allows any combination of known and unknown parameters in the complete model. If, for example, there is a filter applied to the raw measurements to get the sampled values available for use in the identification, then that known filter would be accounted for in the derivation of the expressions for the parameters $a_1 \ldots a_{n_a}$ $b_1 \ldots b_{n_b}$.

The required prediction gradient $\psi^T(t)$ can be derived analytically, especially for simple model structures. Alternatively, it can be obtained by numerical differentiation in the following way. A small deviation is introduced in each of the estimated parameters (elements of $\theta$), one by one, and the prediction is calculated for each case. The resulting deviation in prediction is then divided by the parameter deviation, for each of the estimated parameters, to form the corresponding element of the gradient.

If discrete time model parameters were to be estimated, like $a_1 \ldots a_{n_a} b_1 \ldots b_{n_b}$ of the model type (3), you can see from (6) and (7) for the first order example that variations in any of the actual parameters gain (K), time constant ($\tau$) or speed independent deadtime ($D_0$) will affect at least two of the estimated parameters $a_1$, $b_1$, and $b_2$. Since any variations in the true basic parameters gain (K), time constant ($\tau$) or speed independent deadtime ($D_0$) are expected to be independent from each other, and also because it is possible for any user to interpret the meaning of their values, estimating them directly is better than estimating $a_1$, $b_1$, and $b_2$. The user will be able to judge whether the estimated values are plausible. The calculations involved to estimate the parameters of the continuous time model are more complex, but that problem is solvable with readily available hardware today, once the required software implementation of the developed algorithms is done.

The tuning of the controller is based on a model of the process. Also the effect of sampling, and in particular of filters applied to the measurement are taken into account. Any model based tuning method, suitable for the model and controller types used, could be applied. For PI control, a very simple one is known as lambda tuning, aiming at a closed-loop system with specified time constant lambda ($\lambda$). Often the user specifies the lambda factor, or slowdown factor, $\lambda_f$, rather than lambda itself. In its well-known basic form, lambda tuning is only applicable to first order systems with or without deadtime. It can also be applied to a higher order model, after simplification of the model to order one. As an example of a simple model order reduction, a third order model with three time constants and a deadtime $$\frac{Ke^{-Ds}}{(1+\tau_1 s)(1+\tau_2 s)(1+\tau_3 s)} \quad T_1 \geq T_2 \geq T_3 \tag{8}$$

can, for this purpose, be approximated with the first order plus deadtime model $$\frac{Ke^{-D_r s}}{1+\tau_1 s} \quad D_r = D + \frac{\tau_2 + \tau_3}{2} \tag{9}$$

Then lambda tuning applied to this model gives the PI controller gain k and reset time $T_1$ as $$T_I = \tau_1 \tag{10}$$

$$k = \frac{T_I}{K(\lambda + D_r + T_s)} = \frac{T_I}{K\left(\lambda + D + \frac{\tau_2 + \tau_3}{2} + T_s\right)}$$

if the controller sampling period is $T_s$. This summarizes one variant of lambda tuning for models with one, two or three time constants and a deadtime ($\tau_3$ and $\tau_2$ are allowed to be zero in the formula (10)). The lambda $\lambda$ in (10) would be determined from the lambda factor $\lambda_f$ as $$\lambda = \lambda_f \left(\tau_1 + \frac{D + \tau_2 + \tau_3}{2}\right) \tag{11}$$

If there is a measurement filter, not included in the process model, it is taken into account by including it in the dynamic model to be reduced to first order. The case of an FIR filter (finite impulse response) with $n_f$ equal coefficients, for example, can for this purpose be approximated with a first order time constant $\tau_f = (n_f - 1)T_b/2$, where $T_b$ is the filter sampling period.

There are other variants of the precise formulation of lambda tuning, regarding for example the inclusion of the sampling period Ts in the formula, the relation between $\lambda$ and $\lambda_f$, application to integrating processes, and for application to higher order models also the way of reducing the model order. Those variants are not detailed here. Furthermore, lambda tuning is only mentioned as an example, and the method described in the invention is equally well applicable with other variants of model based tuning.

It is noted that while the above describes exemplifying embodiments of the invention, there are several variations and modifications which may be made to the disclosed solution without departing from the scope of the present invention as defined in the appended claims.

The invention claimed is:

1. A method for tuning a controller controlling a property of an industrial process having varying material flow rate, the method comprising:
   injecting excitation signals added to an output signal of the controller,
   receiving measurements of said property in response to said excitation signals,
   choosing a process model structure which is time continuous and comprises at least one parameter with unknown value, the parameter being independent of varying material flow rate,
   estimating a value of said at least one parameter, based on said measurements of said property and an output signal from the controller,
   calculating a model that describes dynamics from controller output to controller input based on the estimated value of said parameter, and on a basis thereof performing model based tuning of the controller,
   reducing a parameter update size, when an unrestricted update reaches outside an area of defined allowed parameter ranges, but making a parameter update in a same direction in a parameter space, and
   applying a same reduction factor to both regressors and prediction error, to be used in both parameter update and update of matrix holding information necessary in recursive estimation,
   thereby keeping parameter estimates within allowed ranges.

2. The method according to claim 1, further comprising:
   choosing a process model structure comprising at most one model parameter per input/output pair being affected by varying actual gain of the industrial process.

3. The method according to claim 1, further comprising:
   choosing a process model structure comprising at most one model parameter per actuator being affected by varying actual response times of actuators.

4. The method according to claim 1, further comprising:
   including, in the process model structure, any delays due to data processing and communication, and
   choosing said process model structure such that variations of said delays do not influence more than one model parameter per model input.

5. The method according to claim 1, further comprising:
   composing said process model structure of two parts, one part describing transport behavior where possible deadtimes and possible time constants are inversely proportional to the material flow rate, and another part that is independent of the material flow rate.

6. The method according to claim 1, further comprising:
   deriving a first order plus deadtime model for each part of said model,
   introducing a transport behavior parameter that defines a degree of pure deadtime in relation to pure first order response of the transport behavior,
   having, in a case of pure deadtime transport behavior, a deadtime described by a known distance,
   having, in the case of pure first order transport behavior, an associated time constant described by the known distance, and estimating at least one of the parameters gain, flow independent time constant, flow independent deadtime and transport behavior parameter.

7. The method according to claim 1, further comprising: estimating at least one parameter using a prediction error method.

8. The method according to claim 7, further comprising: choosing the process model structure $$\frac{Ke^{-D_0 s}}{1+\tau s} \frac{e^{-\frac{L_d}{v}\xi s}}{1+\frac{L_m}{v}(1-\xi)s}$$

wherein K represents the estimated parameters gain, $D_0$ represents flow independent deadtime, $\xi$ represents transport behavior parameter, $L_d$ represents known distance describing the deadtime, and $L_m$ represents the known distance describing the associated time constant.

9. The method according to claim 1, further comprising: reducing, for a case of large prediction errors, an effect of measurements and regressors according to a belief factor calculated from a ratio between prediction error size and estimated standard deviation of previous prediction errors, and thereby achieving protection against outliers.

10. The method according to claim 1, further comprising: sampling process outputs at a basic sampling rate, applying a filter with the same basic sampling rate, and re-sampling to a slower sampling rate, this rate being used for logging of values from operation of the industrial process, and including an effect of this sampling, filtering and re-sampling in prediction calculations and parameter estimate updates.

11. The method according to claim 1, further comprising: performing an identification experiment meaning operating the industrial process with intentional excitation influencing at least one manipulated variable, and estimating at least one parameter on-line during said identification experiment.

12. The method according to claim 11, further comprising: presenting results to a user in real-time, thereby allowing user decision to end the identification experiment.

13. The method according to claim 11, further comprising: estimating fewer parameters during operation with on-line updating of the controller than during the identification experiment, and allowing an parameter estimation result from the identification experiment to define the value of at least one parameter, and treating this parameter or these parameters as known during the operation with on-line updating of the controller.

14. The method according to claim 1, further comprising: calculating on-line said model based tuning of the controller.

15. The method according to claim 1, further comprising: estimating at least one parameter on-line during operation of the industrial process and while controlling it with said controller, performing on-line said model based tuning calculations for the controller, and applying the tuning result to said controller on-line, thereby achieving true adaptive control.

16. The method according to claim 1, further comprising: using lambda tuning as model based tuning method for said controller.

17. A device for tuning a controller controlling a property of an industrial process having varying material flow rate, the device comprising:

an adder for adding excitation signals to a controller output signal, a measurement system for measuring said property in response to said excitation signals, and a model based tuning unit adapted to estimate a value of at least one parameter with unknown value of a time continuous process model structure describing an effect of varying material flow rate, based on said measurements of said property and the controller output signal, the parameter being independent of the varying material flow rate, and to calculate a model that describes dynamics from controller output to controller input based on the estimated value of said parameter, to reduce a parameter update size, when an unrestricted update reaches outside an area of defined allowed parameter ranges, but making a parameter update in the same direction in a parameter space, to apply a same reduction factor to both regressors and prediction error, to be used in both parameter update and update of matrix holding information necessary in recursive estimation, thereby keeping parameter estimates within allowed ranges, and to perform model based tuning of the controller based on said model that describes the dynamics from controller output to controller input.

18. A non-transitory computer readable medium storing computer readable program code for causing a computer to perform the steps of:

injecting excitation signals added to an output signal of a controller, receiving measurements of said property in response to said excitation signals, choosing a process model structure comprising at least one parameter with unknown value, this model structure describing an effect of varying material flow rate, estimating a value of said at least one parameter, based on said measurements of said property and an output signal from the controller, calculating a model that describes dynamics from controller output to controller input based on the estimated value of said parameter, and on a basis thereof performing model based tuning of the controller, reducing a parameter update size, when an unrestricted update reaches outside an area of defined allowed parameter ranges, but making a parameter update in the same direction in a parameter space, and applying a same reduction factor to both regressors and prediction error, to be used in both parameter update and update of matrix holding information necessary in recursive estimation, thereby keeping parameter estimates within allowed ranges.

* * * * *